US011039638B2

(12) United States Patent
Koelemeijer

(10) Patent No.: US 11,039,638 B2
(45) Date of Patent: Jun. 22, 2021

(54) APPARATUS FOR DRYING AND/OR ROASTING BEANS OR NIBS

(71) Applicant: Royal Duyvis Wiener B.V., Koog aan de Zaan (NL)

(72) Inventor: Reiner Koelemeijer, Wormer (NL)

(73) Assignee: Royal Duyvis Wiener B.V.

( * ) Notice: Subject to any disclaimer, the term of this patent is extended or adjusted under 35 U.S.C. 154(b) by 198 days.

(21) Appl. No.: 16/075,284

(22) PCT Filed: Feb. 6, 2017

(86) PCT No.: PCT/EP2017/052563
§ 371 (c)(1),
(2) Date: Aug. 3, 2018

(87) PCT Pub. No.: WO2017/134309
PCT Pub. Date: Aug. 10, 2017

(65) Prior Publication Data
US 2019/0069593 A1    Mar. 7, 2019

(30) Foreign Application Priority Data
Feb. 5, 2016   (EP) ..................... 16154459

(51) Int. Cl.
*A23N 12/10*       (2006.01)
*F26B 11/04*       (2006.01)
(Continued)

(52) U.S. Cl.
CPC ........... *A23N 12/125* (2013.01); *A23G 1/002* (2013.01); *A23G 1/06* (2013.01); *A23N 12/10* (2013.01);
(Continued)

(58) Field of Classification Search
CPC ....... A23N 12/10; A23N 12/08; A47J 37/047; A47J 37/046; F26B 11/04; F26B 11/049; F26B 11/0477
(Continued)

(56) References Cited

U.S. PATENT DOCUMENTS 1,524,387 A   1/1925 Burns et al.
1,547,655 A   7/1925 Johnston
(Continued)

FOREIGN PATENT DOCUMENTS

DE    528721 C     7/1931
DE    2207803 A1 * 8/1973  ............. A23N 12/10
(Continued)

OTHER PUBLICATIONS

International Search Report and Written Opinion; dated May 17, 2017 for PCT Application No. PCT/EP2017/052563.
(Continued)

*Primary Examiner* — Reginald Alexander
(74) *Attorney, Agent, or Firm* — Mendelsohn Dunleavy P.C.

(57) ABSTRACT

The invention relates to an apparatus (1) for drying and/or roasting beans for foodstuff, such as cocoa beans, or parts of beans, such as cocoa nibs, comprising a frame, a drum (2) for receiving the beans or parts of beans rotatably mounted in the frame and at least partially closed at one end (3) and open at the other (4), a shell (5) enveloping the drum (2), a door (7) for closing the open end (4) of the drum (2), a heater (19) for heating the drum (2), and a fan and a valve (26) for maintaining an underpressure in the space (20) between the drum (2) and the shell (5). A seal (30) is located in the clearance between the drum (2) and the shell (5).

20 Claims, 1 Drawing Sheet

(51) Int. Cl.
    *A23N 12/12*         (2006.01)
    *A23G 1/00*          (2006.01)
    *A47J 37/04*        (2006.01)
    *A23G 1/06*         (2006.01)
    *A23N 12/08*        (2006.01)

(52) U.S. Cl.
    CPC ............ *A47J 37/047* (2013.01); *F26B 11/04* (2013.01); *F26B 11/049* (2013.01); *A23N 12/08* (2013.01)

(58) Field of Classification Search
    USPC ............. 99/427, 479, 474, 286; 34/108, 140
    See application file for complete search history.

(56) References Cited

U.S. PATENT DOCUMENTS

| | | |
|---|---|---|
| 2,279,362 A | 4/1942 | Baker |
| 4,111,439 A | 9/1978 | Schmidt |
| 8,959,789 B2 * | 2/2015 | Sans Rovira ........... D06F 58/02 34/108 |
| 2003/0025280 A1 | 2/2003 | Divan |
| 2004/0187750 A1 | 9/2004 | Raichle et al. |

FOREIGN PATENT DOCUMENTS

| | | | |
|---|---|---|---|
| EP | 1445566 A1 | 8/2004 | |
| EP | 2689677 A1 * | 1/2014 | ........... A23N 12/125 |
| GB | 3B501199 | 2/1939 | |
| WO | WO9212643 A1 | 8/1992 | |
| WO | WO2009127728 A2 | 10/2009 | |
| WO | WO-2014076211 A1 * | 5/2014 | ............ A23N 12/10 |
| WO | WO2014076211 A1 | 5/2014 | |

OTHER PUBLICATIONS

Communication pursuant to Article 94(3) EPC for corresponding European application No. 17704209.0; dated Oct. 20, 2020 (4 pages).

* cited by examiner

APPARATUS FOR DRYING AND/OR ROASTING BEANS OR NIBS

The invention relates to an apparatus for drying and/or roasting beans for foodstuff, such as cocoa beans, or parts of beans, such as cocoa nibs, comprising a frame, a drum for receiving the beans or parts of beans rotatably mounted in the frame and at least partially closed at one end, e.g. closed or closed and comprising a central conduit, e.g. an inlet for a gas and/or liquid, and open at the other end, and a shell enveloping the drum and typically mounted to the frame, thus defining a space between the shell and the drum. The apparatus further comprises a door for closing the open end of the drum, a heater for heating the drum, preferably an infrared heater or a burner supplying hot air to the space between the drum and the shell, and a fan and one or more valves for maintaining a (slight) underpressure, i.e. a partial vacuum, typically in a range from 0.1 to 1 mbar below ambient pressure, in that space, and thus a pressure difference over the clearance between the drum and the shell near the open end of the drum preventing hot gas from exiting the shell through that clearance.

WO 2014/076211 relates to an apparatus (numeral 1 of the Figures in WO 2014/076211) for drying and/or roasting beans, such as cocoa beans, or parts of beans, such as nibs, comprising a frame (2), a drum (3) for receiving the (parts of) beans, rotatably mounted in the frame (2) and provided with an inlet (8) for a fluid, in particular a gas, such as heated air, a fan (14) for feeding the fluid via the inlet (8) to the drum (3), and a driving means (12) for rotating the drum (3). The fluid inlet (8) and the driving means (12) are located on the same end of the drum (3).

WO 2009/127728 discloses a method for drying and/or roasting cocoa nibs and/or cocoa nib pieces in a drum. In addition to heating the drum from the outside for transferring heat by convection, clean hot gas is fed to the drum.

It is an object of the present invention to provide an improved industrial scale drum roaster.

To this end, the apparatus according to the present invention is characterized by a seal located in the clearance between the drum and the shell. The clearance typically is an at least substantially annular opening at or near, e.g. within 50 centimeter, e.g. within 25 centimeters from, the open end of the drum. In an embodiment, the seal is mounted on or in the shell and preferably stationary with respect to the frame. In another embodiment, the seal is pressed onto the drum, e.g. slides over the (outer) surface of the drum when the drum is rotating.

Drum roasters as defined in the pre-amble have been available for decades and serve to develop flavor and aroma in e.g. cocoa or coffee beans. For reasons of safety, in particular to prevent hazardous hot gas, typically having a temperature in a range from 150 to 250° C. in case of an infrared heater and in a range from 600 to 750° C. in case of a burner, from exiting the space between the drum and the shell, a slight underpressure is maintained in that space. This underpressure is slight and the clearance between the drum and shell near the open end of the drum is narrow and typically induces a considerable flow resistance (pressure drop). Thus, it was assumed that a negligible amount of ambient air is sucked into the roaster via the clearance or at least that the effect of this air is negligible. However, it was found that, contrary to this assumption, the effect of air sucked in from the surroundings through the clearance on the overall thermal efficiency of the drum roaster is extreme, in the order of 10 to 30 percent, sometimes more. With the present invention, this effect is substantially avoided, providing, in an industrial scale drum roaster, substantial savings in operating costs.

The maximum effect is achieved when the seal extends over the entire circumference of the drum, i.e. seals the entire (annular) clearance, but seals extending over part of the circumference, e.g. 60% or more, will typically already improve overall thermal efficiency.

In an embodiment, the open end of the drum is provided with a riding ring, e.g. welded or bolted to the rest of the drum, and the seal is pressed onto the ring. In a refinement, the ring has a width, measured in the axial direction of the drum, larger than the width of the seal, preferably at least 2 cm, preferably at least 3 cm, preferably at least 4 cm larger than the width of the seal. Thus, when the drum expands or contracts the drum slides within the seal in axial direction and contact is maintained, i.e. the space between the drum and the shell remains sealed from the surroundings. In industrial scale drum roasters axial expansion is typically in a range from 20 to 60 millimeters, e.g. 40 millimeters. In an embodiment, to be able to follow expansion and contraction of the drum, the door or at least a part of the door closing the open end of the drum is resiliently mounted to the frame.

In an embodiment, the apparatus comprises two of more wheels, bearings or skids, e.g. mounted on or in the frame, supporting the drum, preferably supporting at least the ring. Thus, the drum can be supported at its closed end by a driving shaft and at its open end via its outer surface or the riding ring.

In another embodiment, the seal comprises a plurality of segments, preferably made of graphite, and a resilient element to press the segments onto the drum. In a refinement, a resilient element, e.g. a spring or cord, is wound about the segments and presses the segments onto the drum. In yet another embodiment, the segments overlap in tangential direction. Such configurations provide effective seals, also during expansion and contraction of the drum in the axial and radial directions. Suitable segmented rotary seals are known in the art, e.g. from US 2004/0187750 and corresponding EP 1 445 566, and applied in kilns, e.g. for drying cement. Although in kilns thermal expansion and contraction is essentially non cyclic, it was found that these seals are suitable in drum roasters, which typically have a cycle in a range of 0.5 to 1.5 hours.

Within the framework of the present invention "industrial scale" is defined as having a capacity of at least 500 kg, preferably at least 1000 kg, preferably at least 2000 kg of (parts of) beans per batch.

In an embodiment, the outlet of the drum roaster comprises a mechanism for moving the door rearwards in axial direction over a limited distance, e.g. a distance in a range from 2 to 15 centimeters, thus providing, e.g. after roasting, sufficient clearance for the nibs to exit the drum, e.g. via a chute. In a refinement, the clearance is at least substantially annular.

In an embodiment, the apparatus comprises a driving means for rotating the drum and located at or near the closed end of the drum. In another embodiment, the apparatus comprises an inlet for a fluid on one end of the drum, a fan for feeding the fluid via the inlet to the drum, and an outlet for the fluid located on the opposite end of the drum.

Further prior art relating to drum roasters includes WO 92/12643, which discloses i.a. that in order to avoid having to dry and roast coffee and cocoa beans (indicated by numeral 10 in the Figure of WO 92/12643) directly in flue gas in a drying furnace, the drying takes place in a drum (6) to which air (1) is supplied, said air being heated by flue gas (5) from a burner (3) in a heat exchanger (18), and where the flue gases (5) are subsequently supplied to the exterior of the drum (6).

U.S. Pat. No. 1,524,387 relates to a peanut roaster, comprising a drum and means for heating the air to be passed through the contents of said drum. The drum is provided with an annular rim, shown in FIG. 4 of U.S. Pat. No. 1,524,387. "Annular rim 119, carried by spider 71 having its hub secured to shaft 72 by set screw 73, provides a support for perforated drum 74 and at the same time effects end closure for drum 74 against cover 14 as at 131 around its entire circumference, also effecting closure against the edge of the opening in frame 1, as at 132. Cover 14 is thus held between flange 119 and collar 82, and is free to move in and out on lugs 84 and 85 to accommodate the expansion and contraction of shaft 72 and drum 74 with changes in temperature. A slight clearance (not shown) is provided between flange 119, cover 14, and collar 82 to provide for differential expansion of shaft 72 and drum 74."

GB 501,199 relates to a roaster for coffee and cocoa beans, peanuts and similar bean like materials comprising a rotating roasting cylinder contained within an enclosing casing and perforated to permit the passage of hot gases.

U.S. Pat. No. 2,279,362 discloses a drum (15) fitted with a series of sheet metal partitioning discs which are pierced by central apertures through which a hollow core member (26) extends. End discs (21) are secured to the drum while further discs are supported by the core member with a loose fit in the drum. The core member forms a conduit for hot air for drying and roasting purposes and adjacent the discharge end of the drum opens into the drum.

U.S. Pat. No. 1,547,655 relates to a method of roasting material, which consists in heating pure air, next directing the pure heated air unmixed with any products of combustion upon the batch of material to be roasted, and lastly checking the roast by an admixture of atmospheric air with said pure heated air.

Further prior art relating to rotary seals includes U.S. Pat. No. 4,111,439, directed to a rotary seal for sealing a large, high temperature rotary drum from the inflow of ambient air where the drum is mounted for rotation in respect to at least one stationary hood, and US 2003/0025280, directed to a seal assembly having a plurality of seal members, each of which is formed by a strip of material having two interlocking portions.

The invention will now be explained in more detail with reference to the Figures, which show an embodiment of the present drum roaster.

Figures 1, 2:
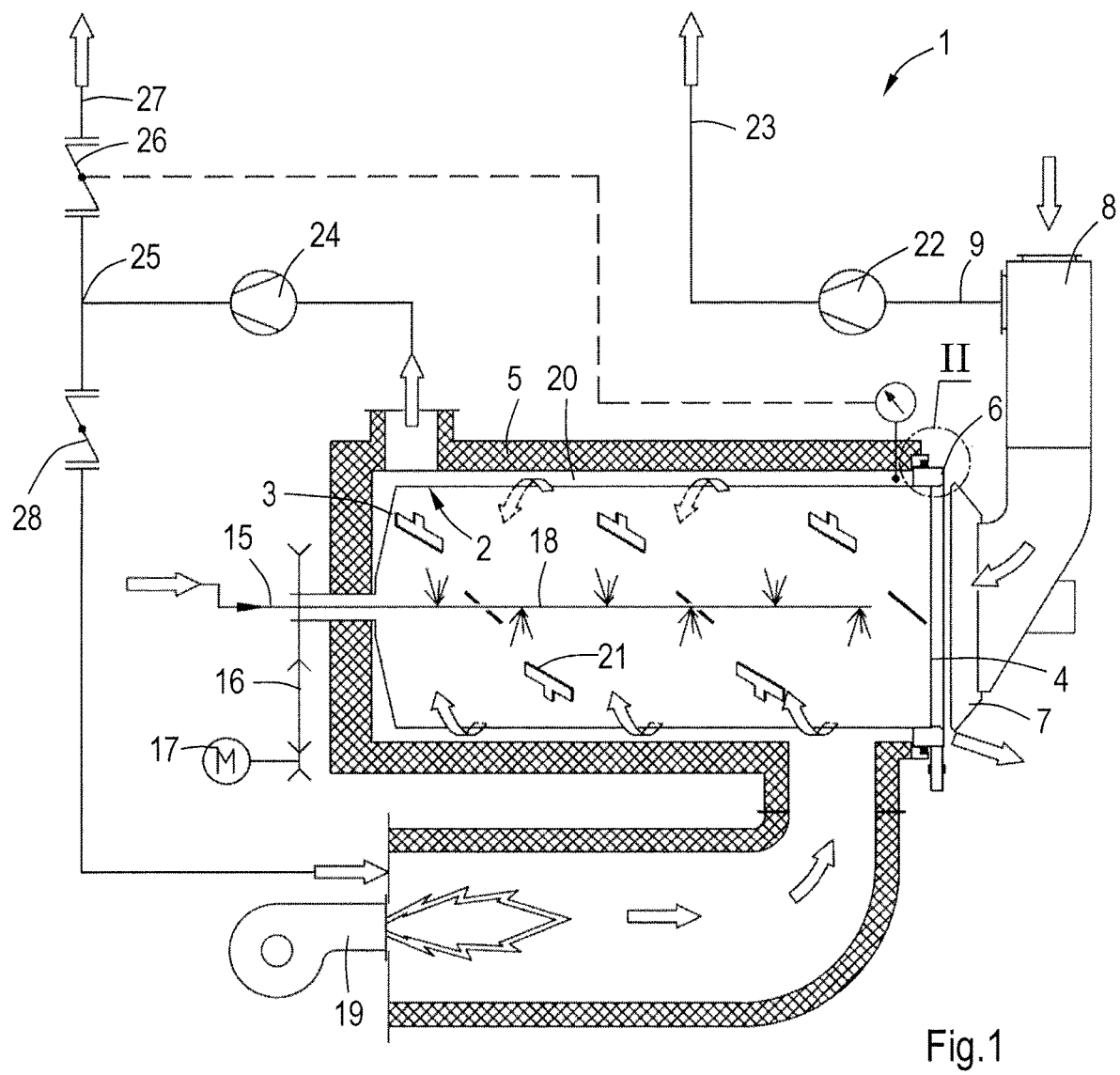
FIG. 1 is a cross-sectional side view of a drum roaster in accordance with the present invention.
FIG. 2 is an enlargement of a detail of FIG. 1.

FIG. 1 shows a drum roaster 1 in accordance with the present invention for drying and/or roasting cacao nibs. The drum roaster comprises a frame (not shown) and a drum 2 for receiving up to five tons of nibs. The drum 2 has an at least partially closed end 3 and an open end 4 and is rotatably mounted in the frame, e.g. by means a bearing at the closed end and by wheels supporting the drum at or near its open end. The drum 2 is enveloped by a shell 5, which is mounted on and stationary with respect to the frame. The open end of the drum is provided with a riding ring 6, shown in more detail in FIG. 2, and closed by means of a door 7. The door in turn is provided with an inlet 8 for the nibs (or beans). The drum roaster 1 comprises a mechanism (not shown), e.g. comprising pneumatic or hydraulic cylinders, for moving the door rearwards, i.e. away from the drum, in axial direction and over a limited distance, preferably over a distance in a range from 2 to 15 centimeters, thus providing, after drying and/or roasting, an annular clearance sufficient for the nibs to exit the drum, e.g. via a chute (not shown) and preferably without fully opening the door. In addition to the inlet for the nibs, the door comprises a fluid outlet 9 for exhausting gas from the drum.

The closed end of the drum comprises a solid cone- or disc-shaped wall provided with an inlet 15 for e.g. water, air and/or other agents e.g. to enhance developing flavour and aroma, and a belt drive 16, comprising a plurality of pulleys, a belt, and a motor 17, for rotating the drum 2. The inlet 15 is coaxial with the axis of rotation of the drum and extends through the driven pulley that is fixed to the drum. In this example, the inlet comprises a tube 18 extending through the greater part of the drum. A burner 19 is mounted near, e.g. below the drum, for supplying hot air to the space 20 between the drum 2 and the shell 4. The circuits for flue gas from the burner and air to be fed to the drum are completely separated.

The drum 2 is provided with two conveyors, e.g. two sets of paddles, a first set of paddles 21 at or near the inner wall of the drum for transporting, as a result of the rotation of the drum 2, the nibs (or, as the case may be, beans) from the closed end 3 towards the open end 4 of the drum 2 and, at a greater distance from the inner wall of the drum than the first set, a second set of paddles (not shown) for transporting, again as a result of the rotation of the drum, the nibs from the open end of the drum towards the closed end of the drum. Thus, the rotation of the drum results in circulation of the nibs (or beans) during drying and/or roasting and, when the door is open, in discharging the nibs from the drum.

A first fan 22 is provided to withdraw gas from the interior of the drum and convey it to a first chimney 23, in this example via the door 7 and outlet 9. A second fan 24 is provided to withdraw flue gas from the space 20 between the drum 2 and the shell 5 and convey it, via a junction 25 and two valves, a first valve 26 for regulating the flow of flue gas to a second chimney 27 and a second valve 28 for regulating the flow of flue gas to back to the burner 19. A sensor 29 is provided in the shell 5 near the open end 4 of the drum 2, to measure the pressure in the space 20 between the drum and the shell. The sensor is connected, via a controller (not shown), to one or both of the valves, in this example to the first valve 26 regulating the flow to the chimney, to maintain a pre-selected underpressure in the space between the drum and the shell and thus a pressure difference over the clearance between the drum and the shell. This pressure difference prevents hot gas from exiting the shell through the clearance.

A seal 30, shown in more detail in FIG. 2, is located in the clearance 20 between the drum 2 and the shell 5. The seal is mounted in the shell and pressed onto the riding ring 6 of the drum 2. The seal comprises a plurality of graphite segments and a resilient element pressing the segments onto the drum. The width of the ring, measured in the axial direction of the drum, is larger than that of the seal to allow the ring to axially slide within the seal. I.e., the resilient element and the excess width of the ring ensure that contact between the seal and the drum is maintained during cyclic thermal expansion and contraction, e.g. 40 mm per cycle in axial direction, of the drum.

The seal substantially prevents surrounding air from being sucked into the drum roaster and increases overall thermal efficiency of the drum roaster by more than 10 percent.

The invention is not restricted to the above-described embodiments, which can be varied in a number of ways within the scope of the claims.

The invention claimed is:

1. Apparatus (1) for drying and/or roasting beans or parts of beans, the apparatus comprising:
   - a drum (2) for receiving the beans or parts of beans and having an at least partially closed end (3) and an open end (4),
   - a shell (5) enveloping the drum (2), wherein the drum (2) is rotatably mounted within the shell (5),
   - a door (7) for closing the open end (4) of the drum (2),
   - a heater (19) for heating the drum (2),
   - a fan and a valve (26) for maintaining an underpressure in the space (20) between the drum (2) and the shell (5), and
   - a seal (30) located in the clearance between the drum (2) and the shell (5), wherein:
     - the open end (4) of the drum (2) is provided with a riding ring (6) and the seal (30) is pressed onto the ring (6); and
     - the ring (6) has a width, measured in the axial direction of the drum (2), that is larger than the width of the seal (30).

2. Apparatus (1) according to claim 1, wherein the seal (30) is mounted on or in the shell (5).

3. Apparatus (1) according to claim 2, wherein the seal (30) is pressed onto the drum (2).

4. Apparatus (1) according to claim 1, wherein the width of the ring (6) is at least 2 cm larger than the width of the seal (30).

5. Apparatus (1) according to claim 1, comprising two or more wheels, bearings, or skids supporting the drum (2) and the ring (6).

6. Apparatus (1) according to claim 1, wherein the seal (30) comprises a plurality of segments and a resilient element to press the segments onto the drum.

7. Apparatus (1) according to claim 6, wherein the segments are made of graphite.

8. Apparatus (1) according to claim 6, comprising a resilient element wound about the segments and urging the segments onto the drum (2).

9. Apparatus (1) according to claim 1, comprising, inside the drum (2), a first conveyor (21) at or near the inner wall of the drum (2) for transporting the beans from the closed end (3) towards the open end (4) of the drum (2).

10. Apparatus (1) according to claim 1, comprising a driving means (16, 17) for rotating the drum (2) and located at or near the closed end (3) of the drum (2) and/or comprising an inlet (15) for a fluid on one end of the drum (2), a fan for feeding the fluid via the inlet (15) to the drum (2), and an outlet (9) for the fluid located on the opposite end of the drum.

11. Apparatus (1) according to claim 1, comprising a burner (19) for supplying hot air to the space (20) between the drum (2) and the shell (95).

12. Apparatus (1) according to claim 1, wherein the drum (2) has a capacity of at least 500 kg of beans or parts of beans.

13. Apparatus (1) according to claim 3, wherein the open end (4) of the drum (2) is provided with a riding ring (6) and the seal (30) is pressed onto the ring (6).

14. Apparatus (1) according to claim 1, comprising two or more wheels, bearings, or skids supporting the drum (2).

15. Apparatus (1) according to claim 5, wherein the seal (3) comprises a plurality of segments and a resilient element to press the segments onto the drum.

16. Apparatus (1) according to claim 7, comprising a resilient element wound about the segments and urging the segments onto the drum (2).

17. Apparatus (1) according to claim 2, comprising, inside the drum (2), a first conveyor (21) at or near the inner wall of the drum (2) for transporting the beans from the closed end (3) towards the open end (4) of the drum (2) and a second conveyor, at a greater distance from the inner wall of the drum (2) than the first conveyor, for transporting the beans from the open end (4) of the drum (2) towards the closed end (3) of the drum (2).

18. Apparatus (1) according to claim 6, comprising a resilient element wound about the segments and urging the segments onto the drum (2).

19. Apparatus (1) for drying and/or roasting beans or parts of beans, the apparatus comprising:
   - a drum (2) for receiving the beans or parts of beans and having an at least partially closed end (3) and an open end (4),
   - a shell (5) enveloping the drum (2), wherein the drum (2) is rotatably mounted within the shell (5),
   - a door (7) for closing the open end (4) of the drum (2),
   - a heater (19) for heating the drum (2),
   - a fan and a valve (26) for maintaining an underpressure in the space (20) between the drum (2) and the shell (5), and
   - a seal (30) located in the clearance between the drum (2) and the shell (5), wherein the seal (30) comprises a plurality of segments and a resilient element to press the segments onto the drum.

20. Apparatus (1) according to claim 19, wherein the segments are made of graphite.

* * * * *